Aug. 22, 1967  I. M. GOULD ETAL  3,336,836
SLIDE PROJECTOR
Filed June 23, 1964  13 Sheets-Sheet 11
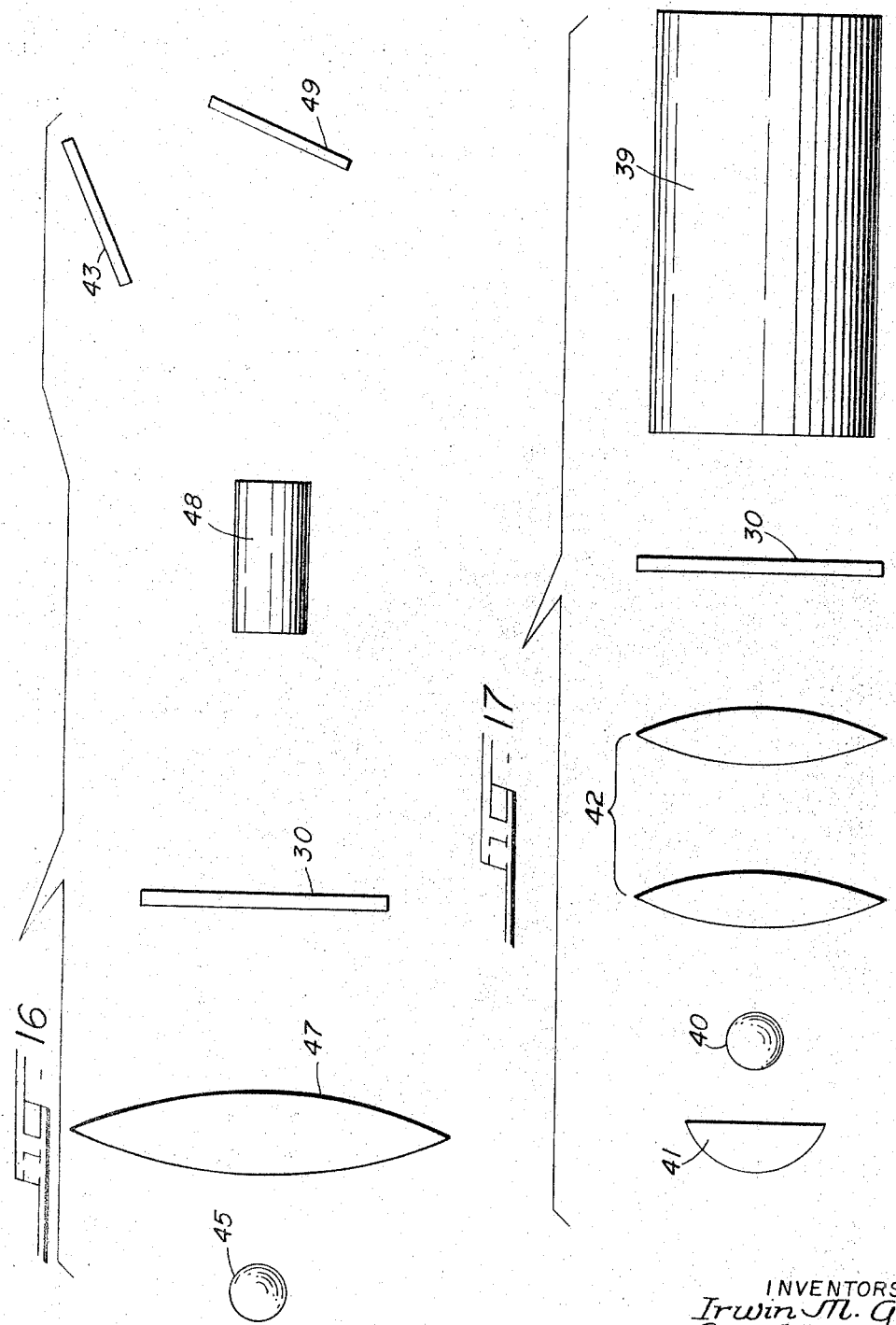
INVENTORS.
Irwin M. Gould
Gerald A. Moe.
BY Barry L. Clark
John E. Peele Jr.
ATTYS.

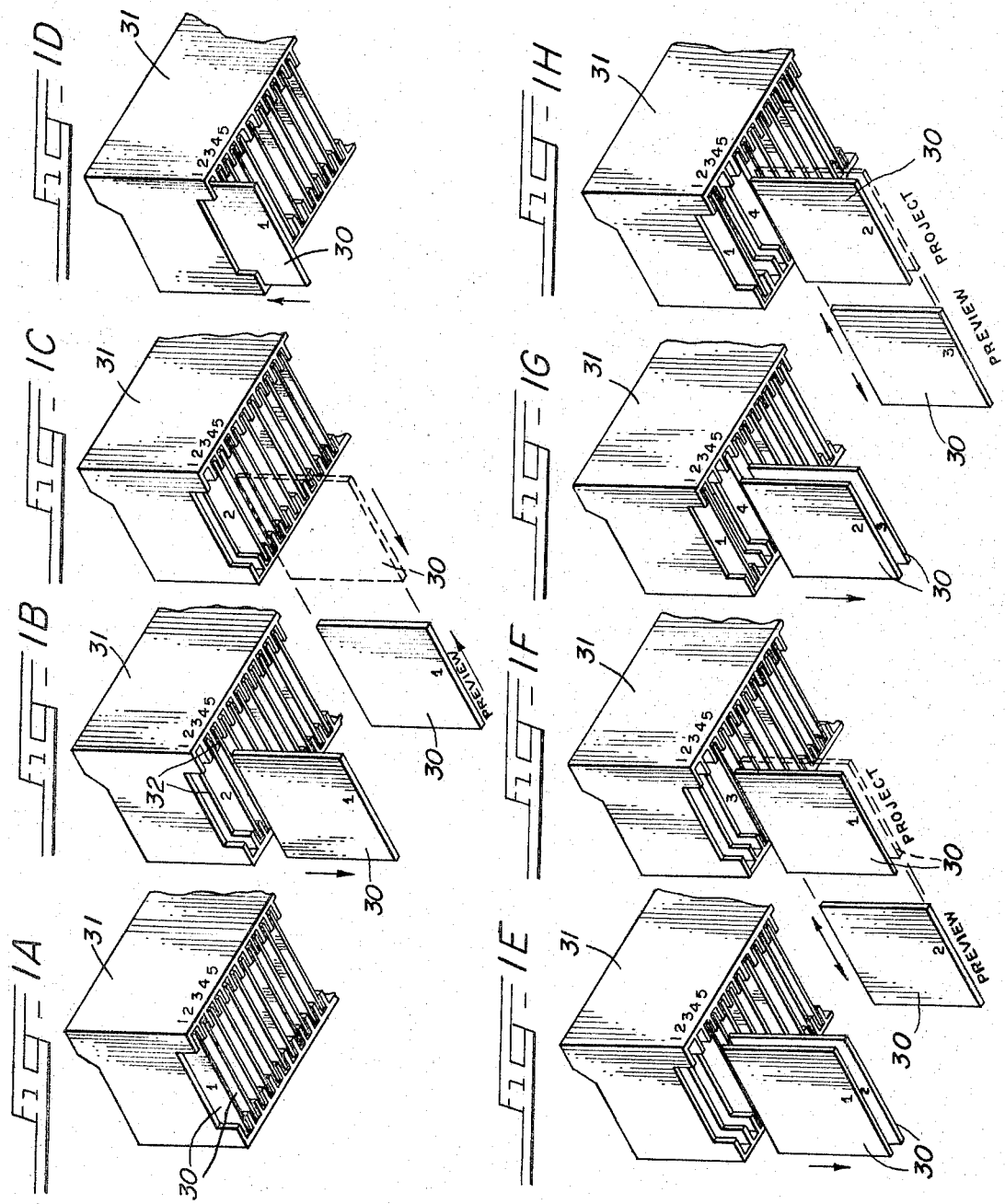

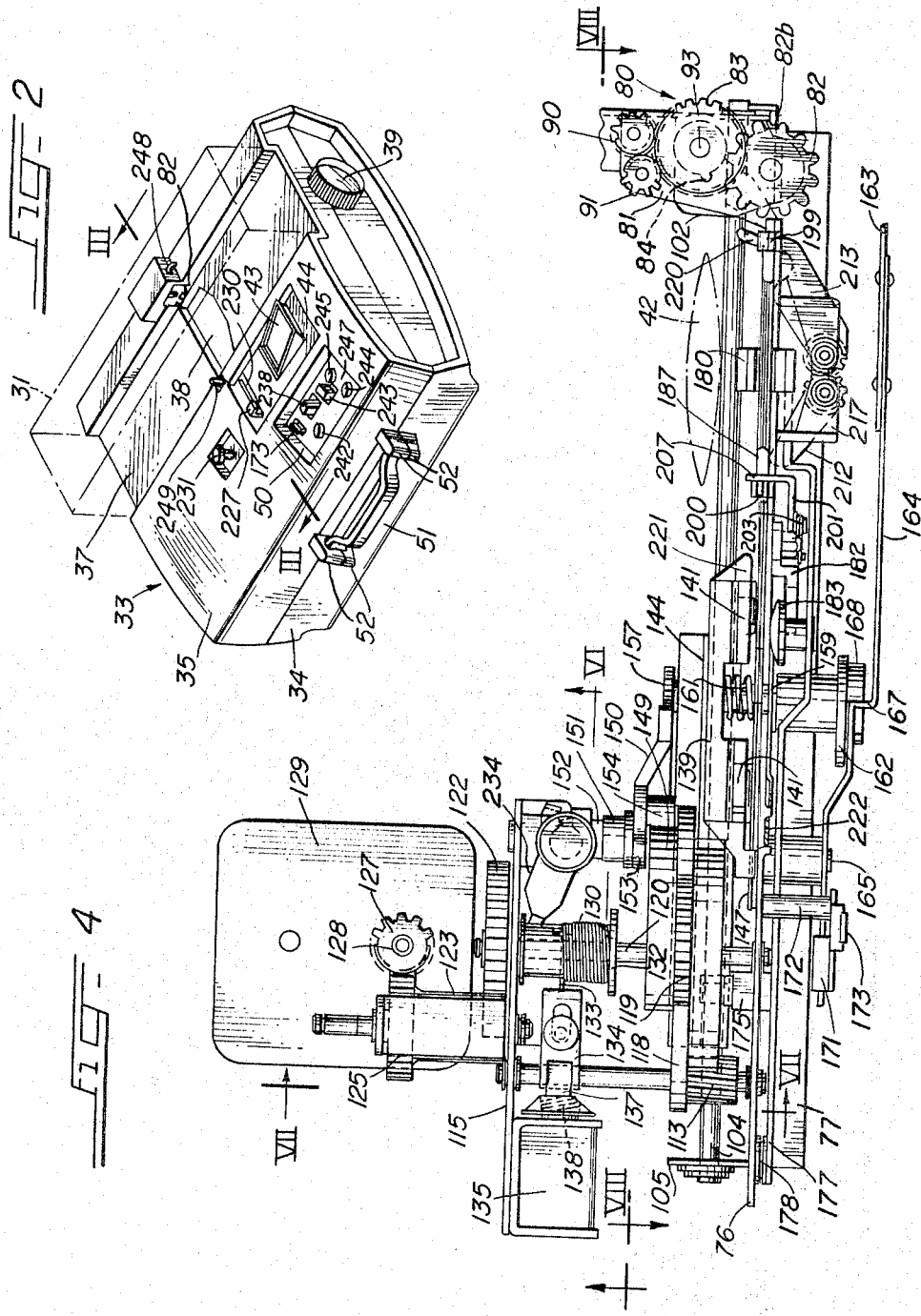

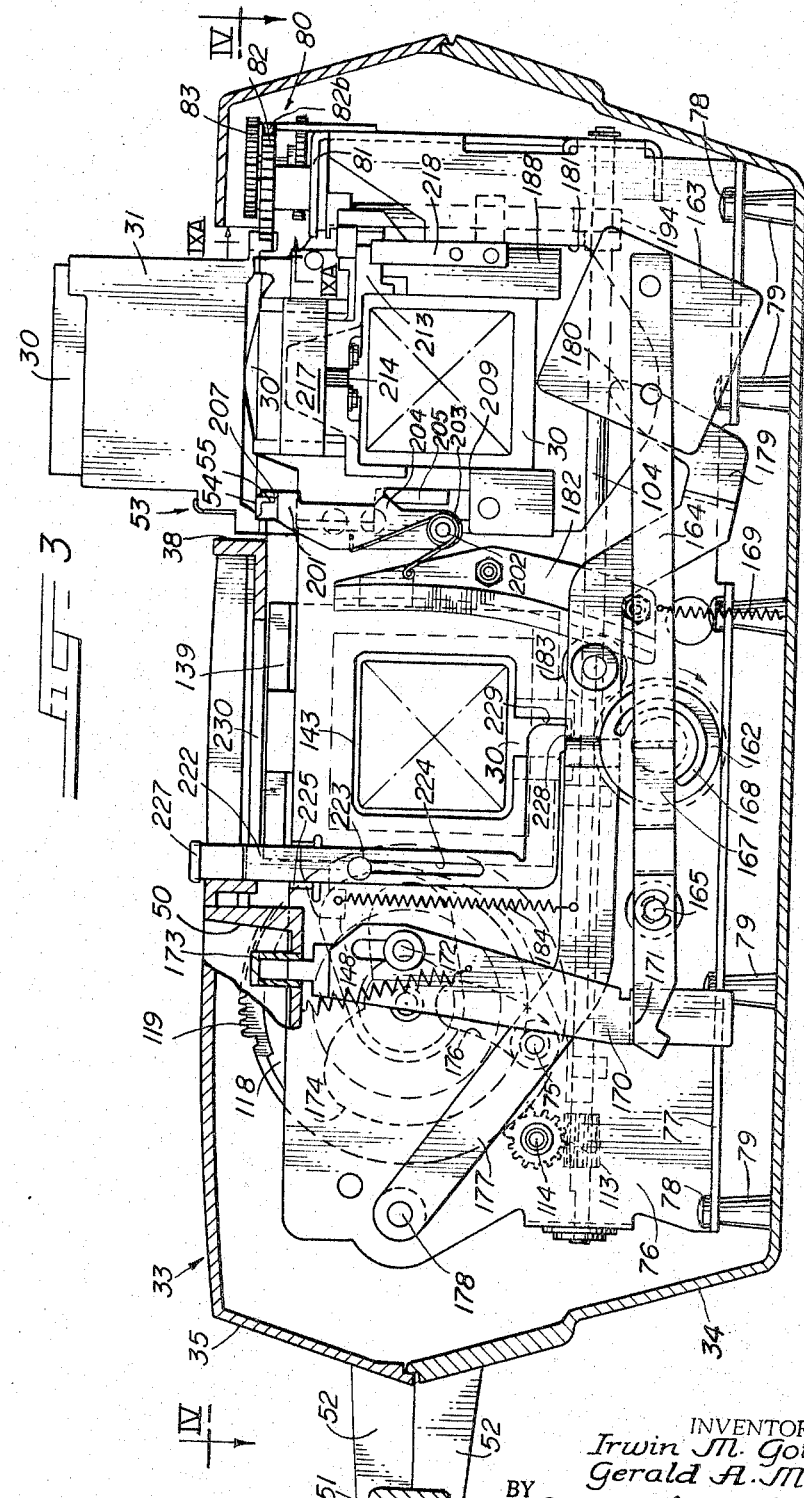

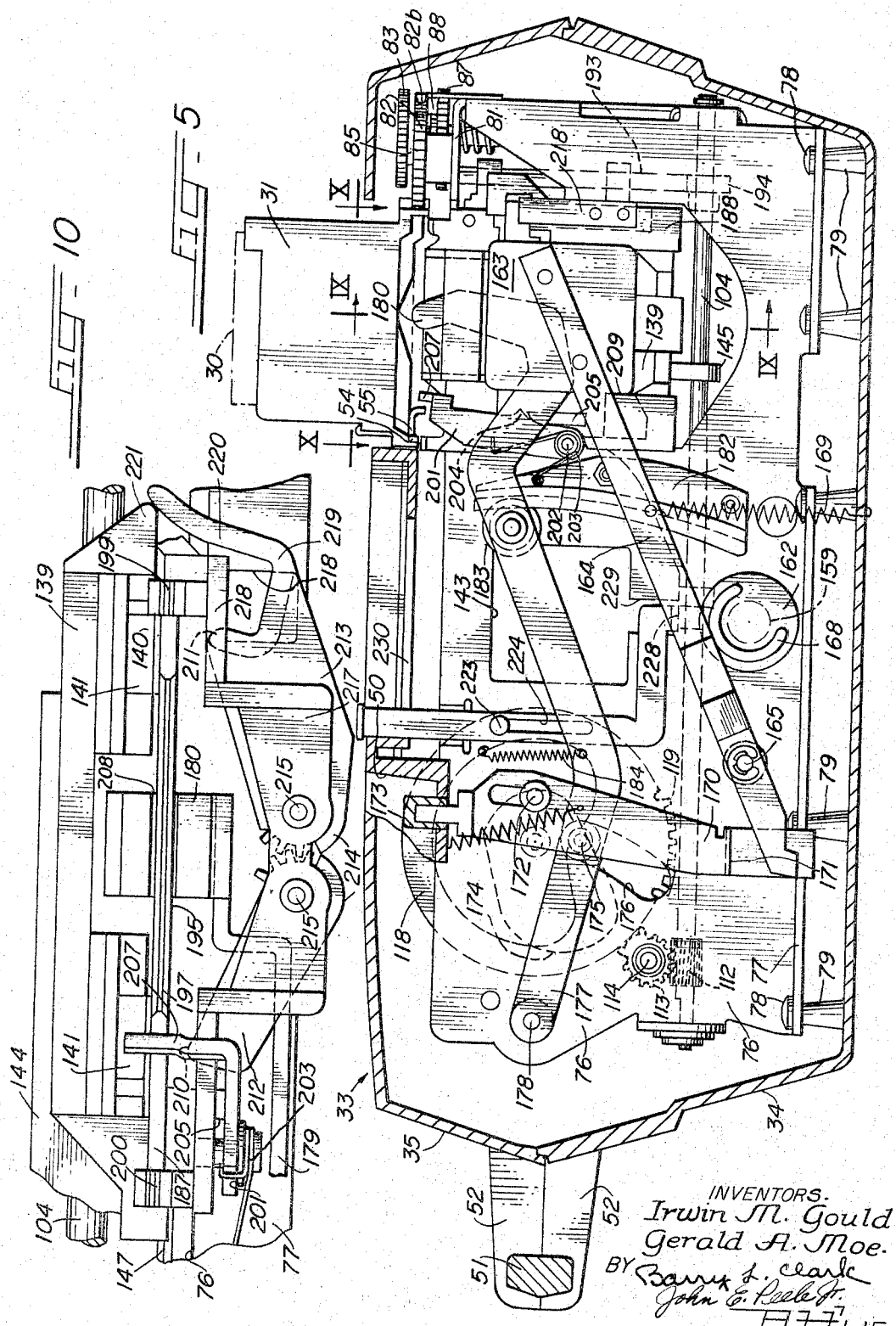

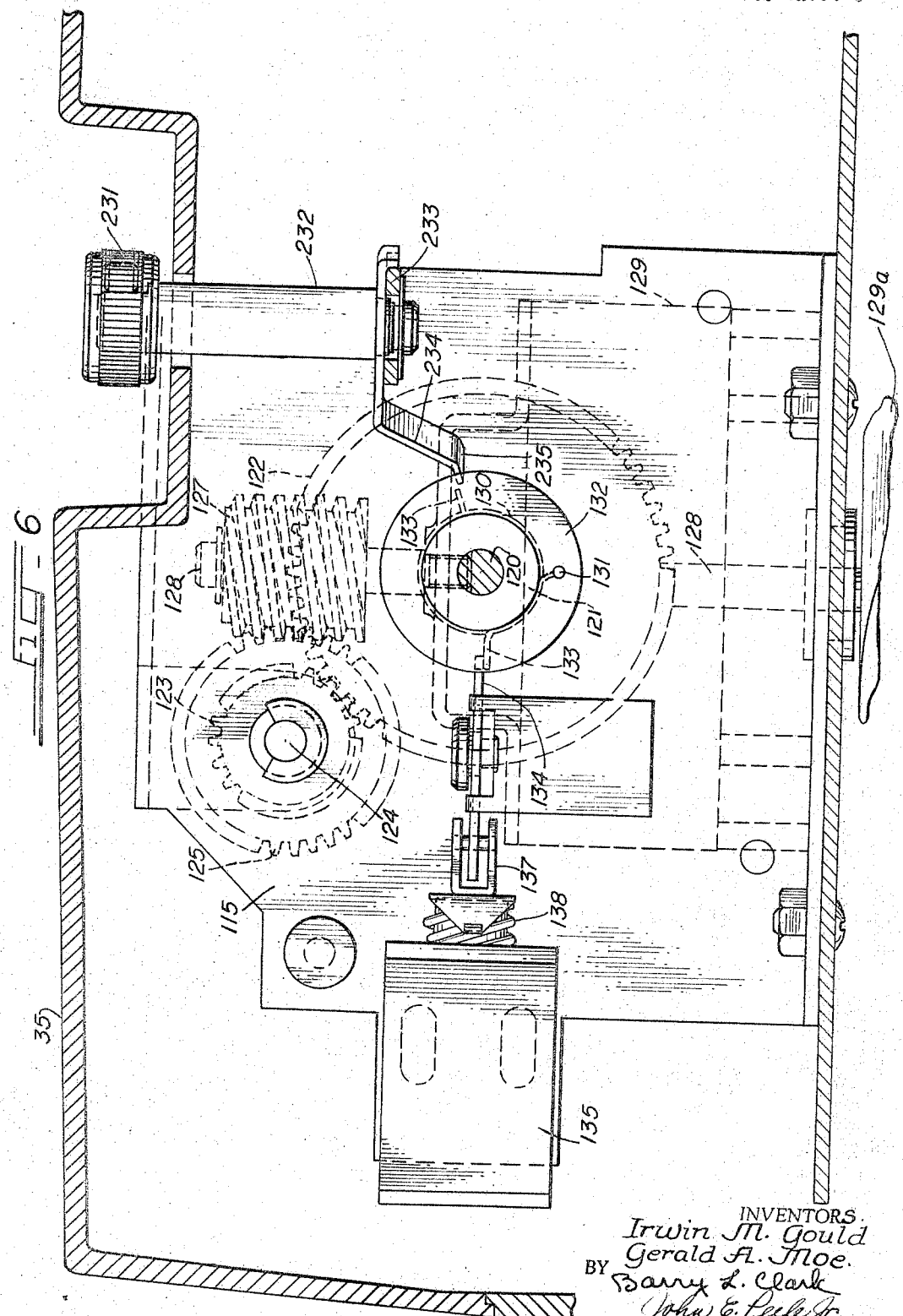

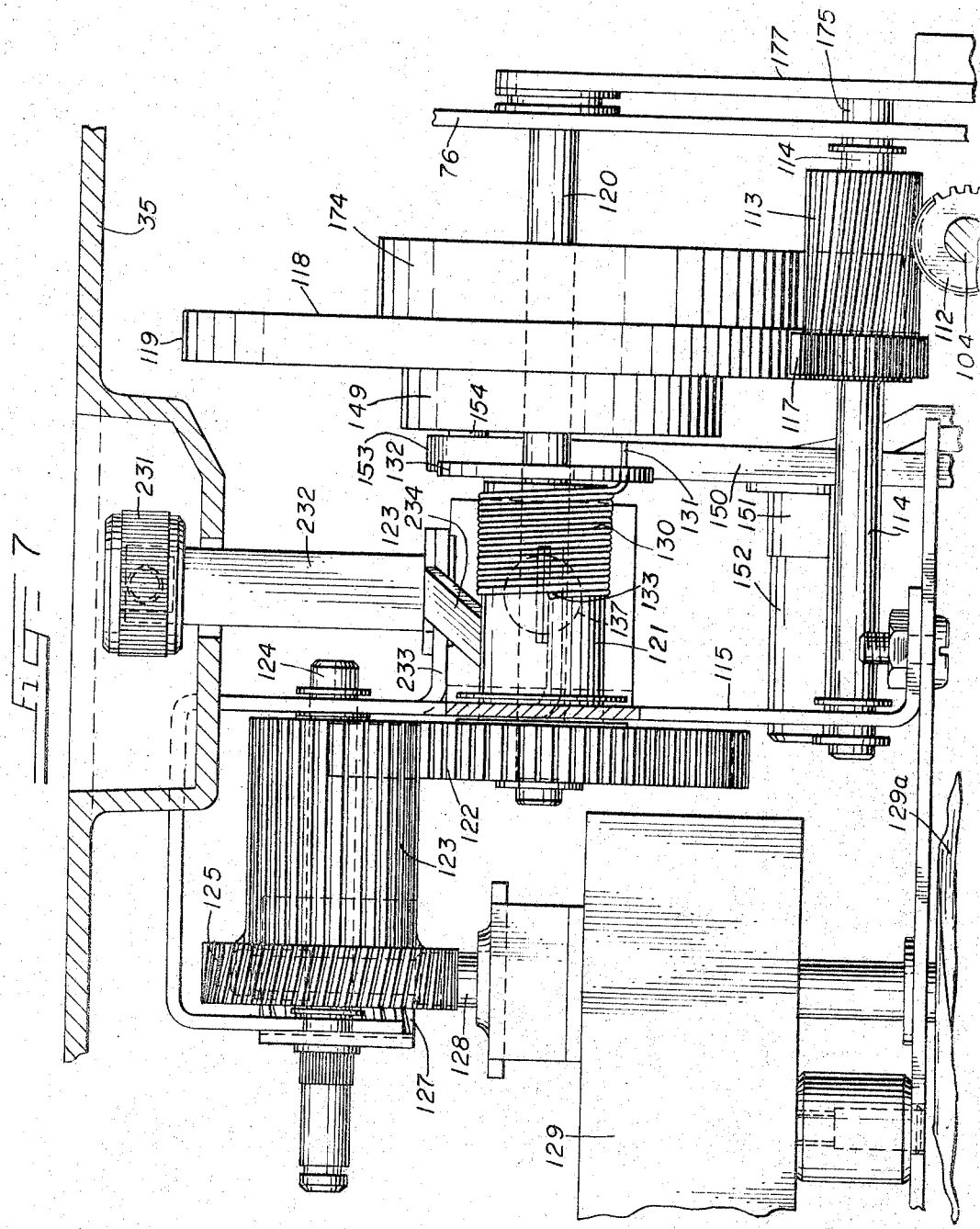

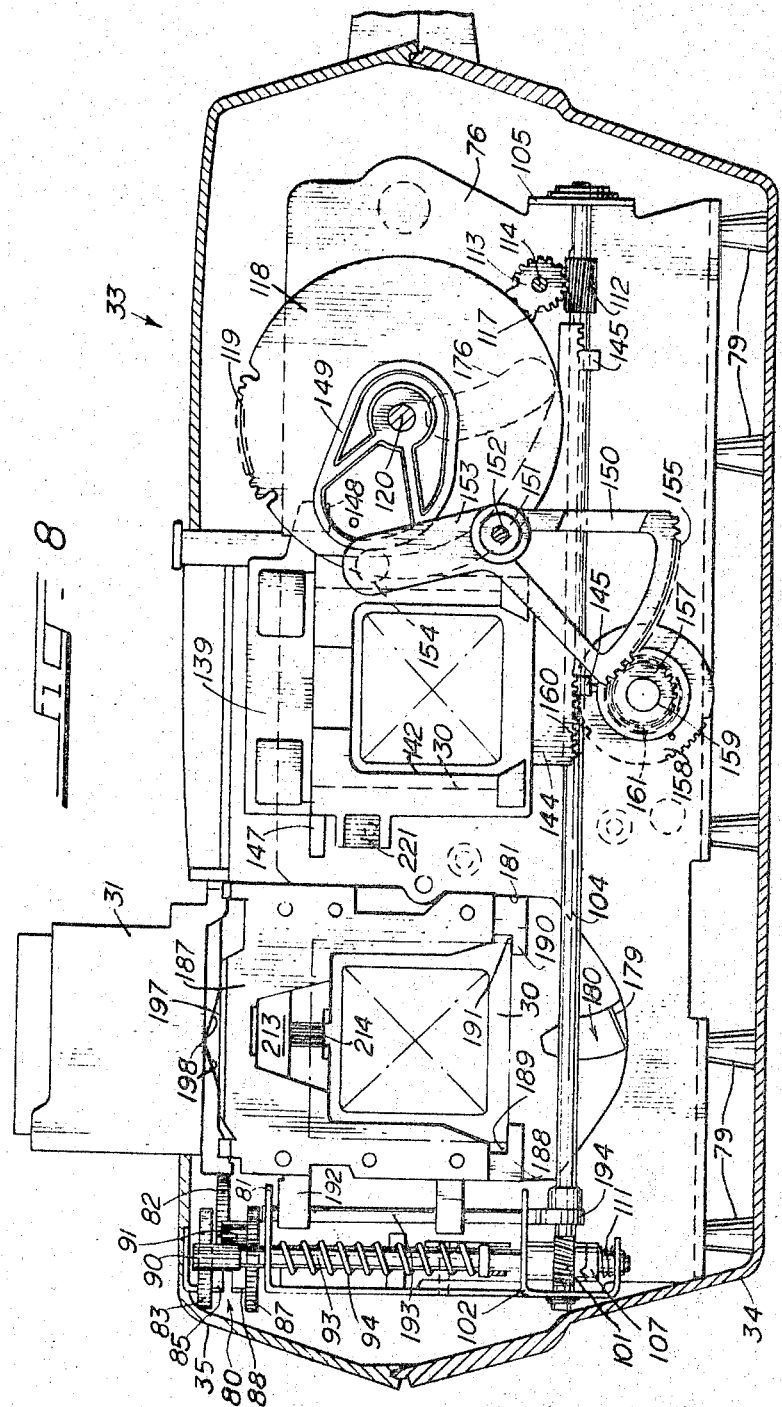

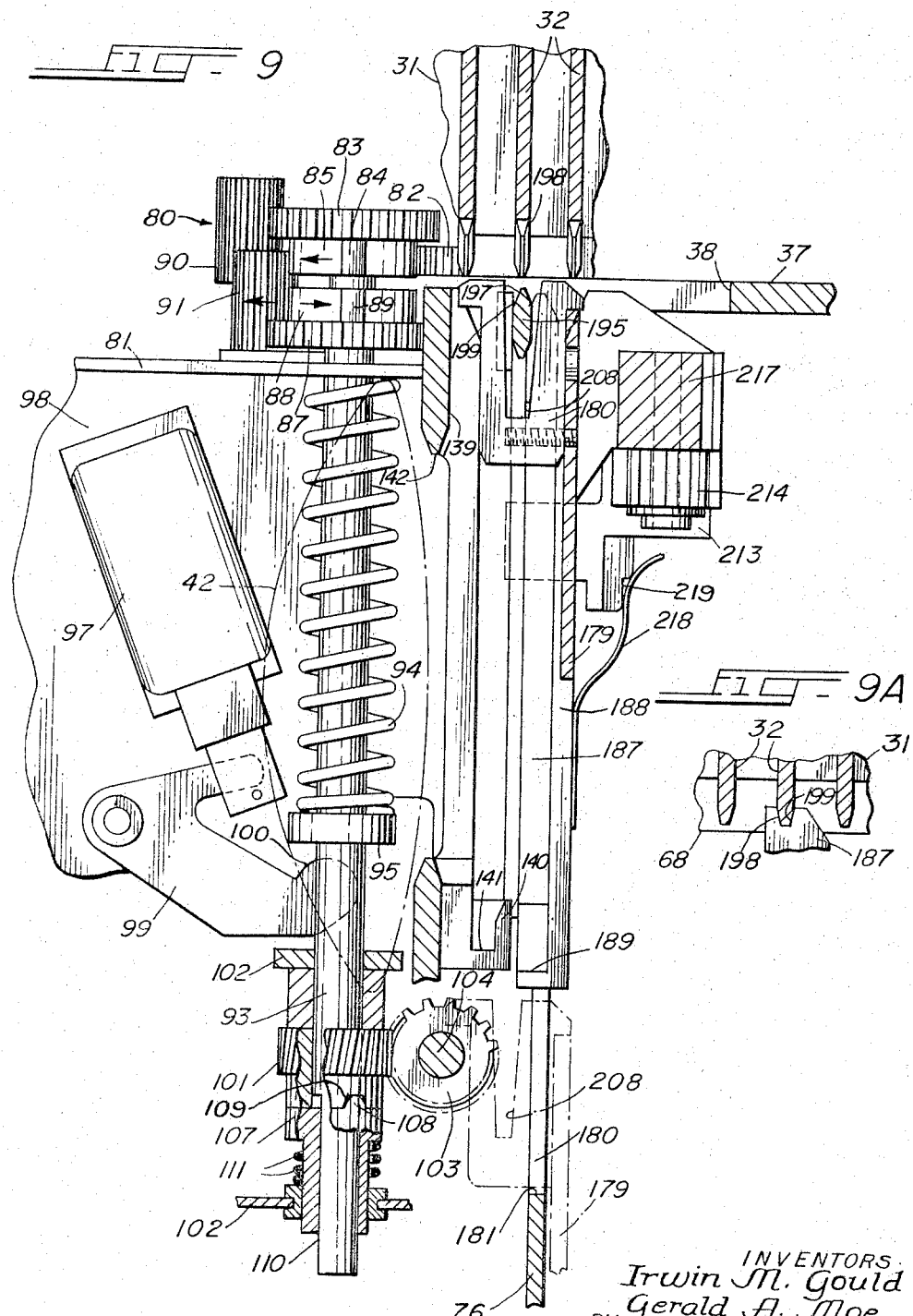

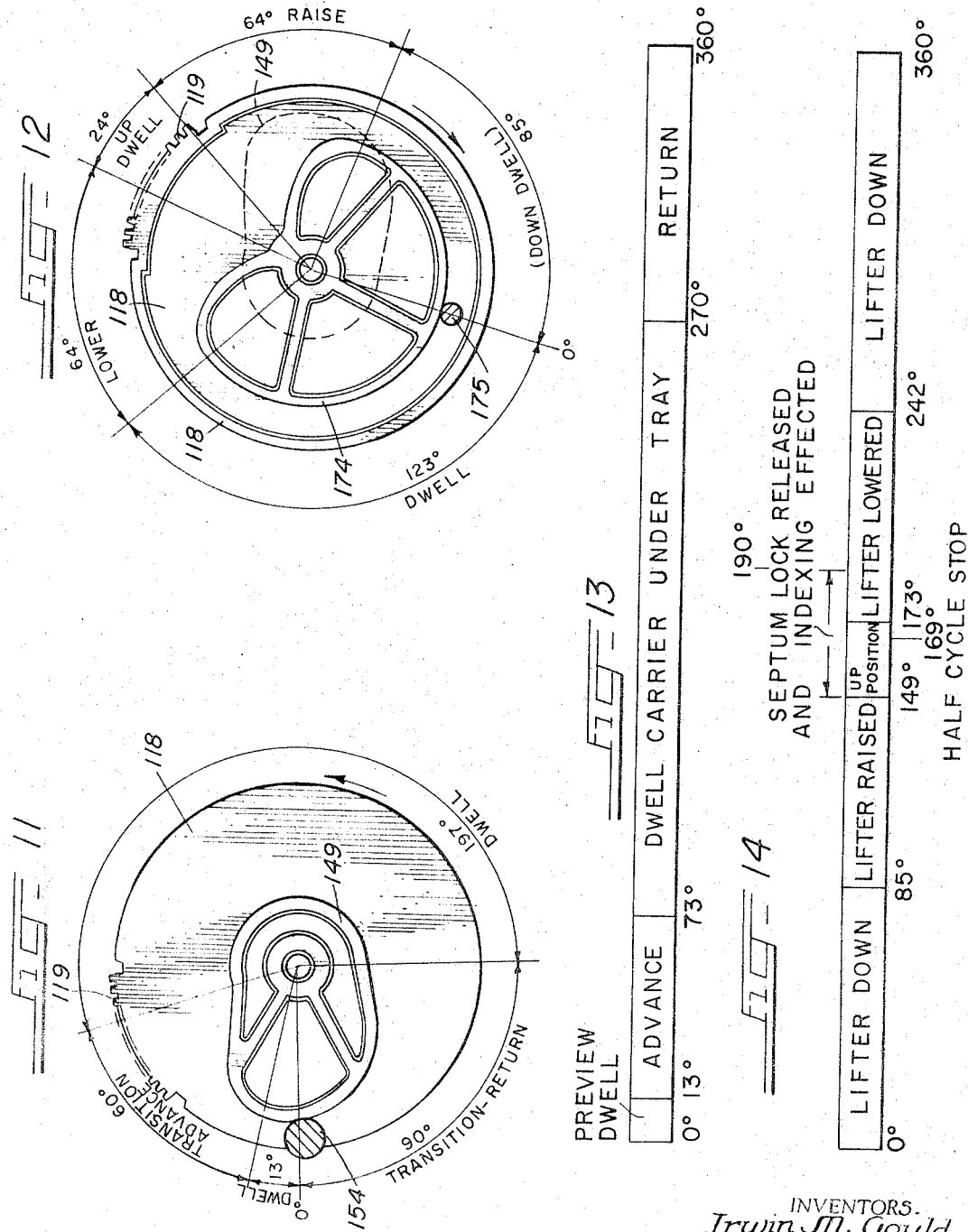

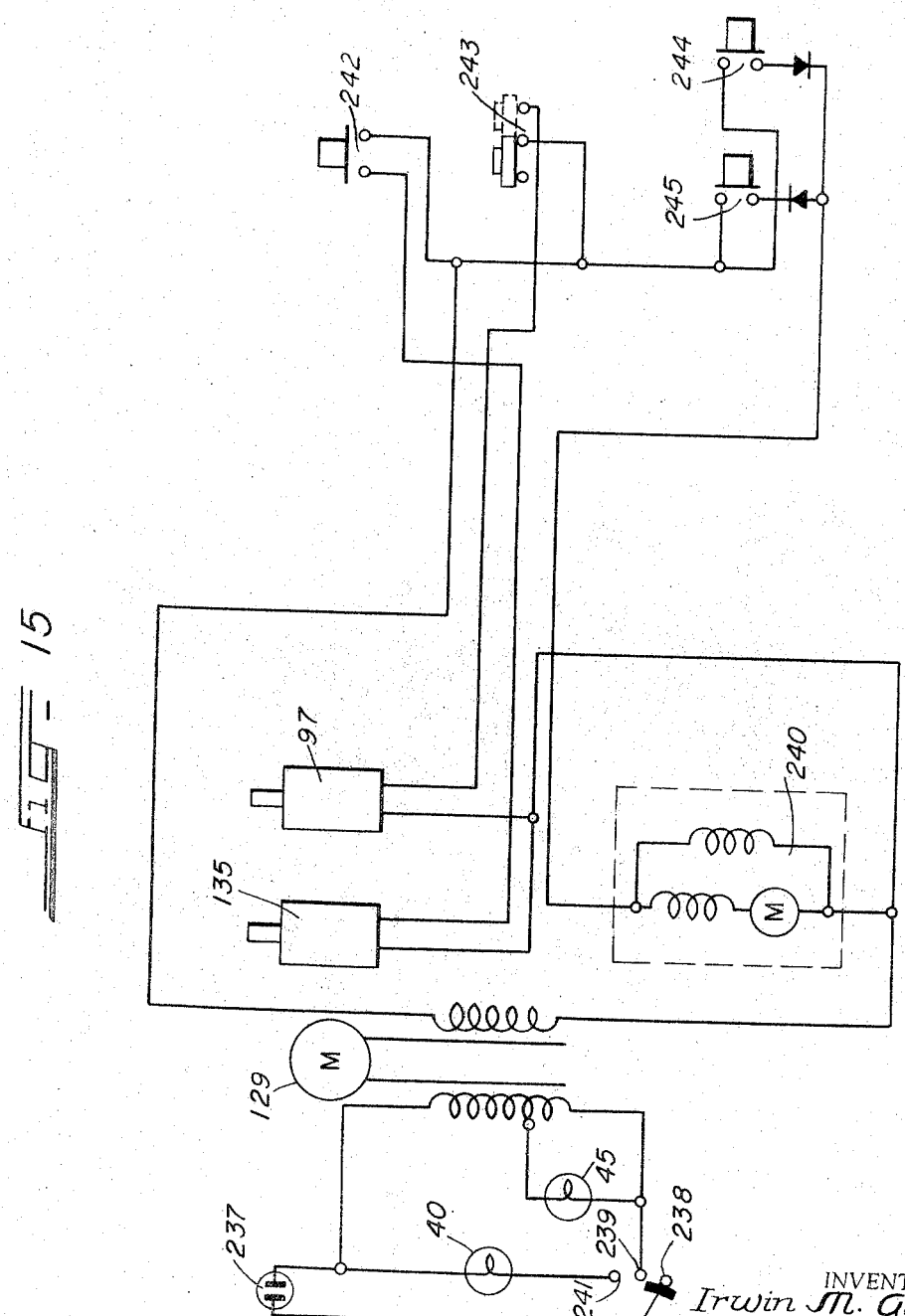

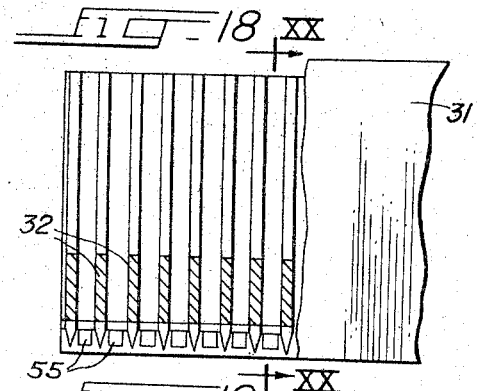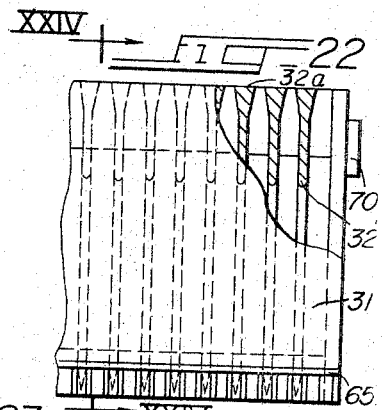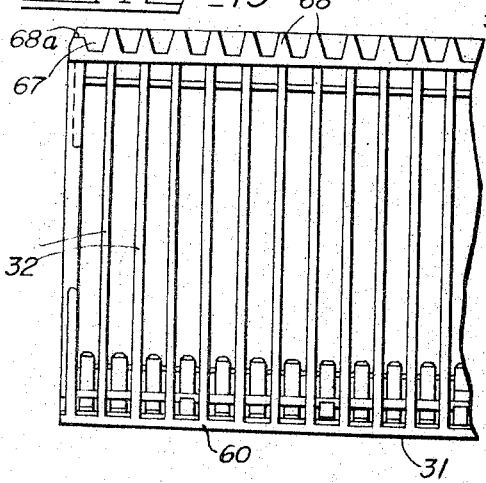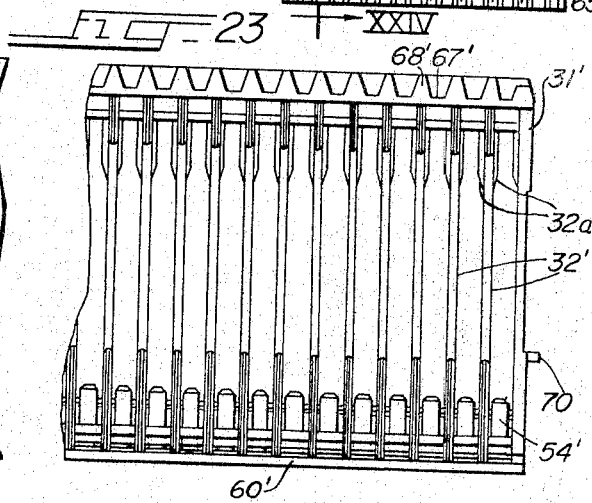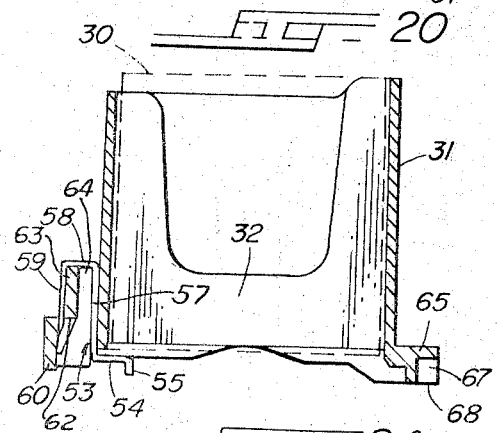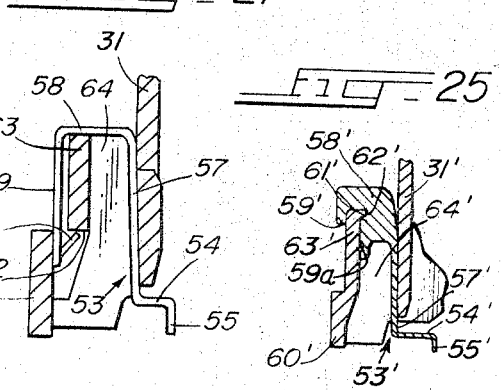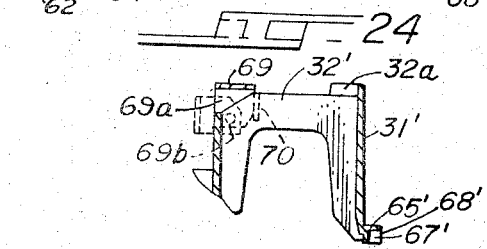

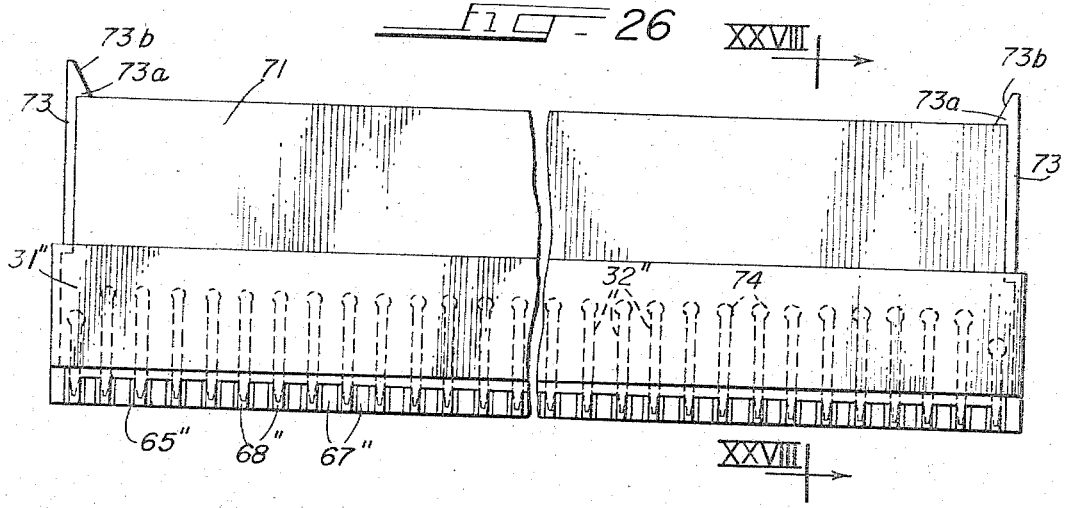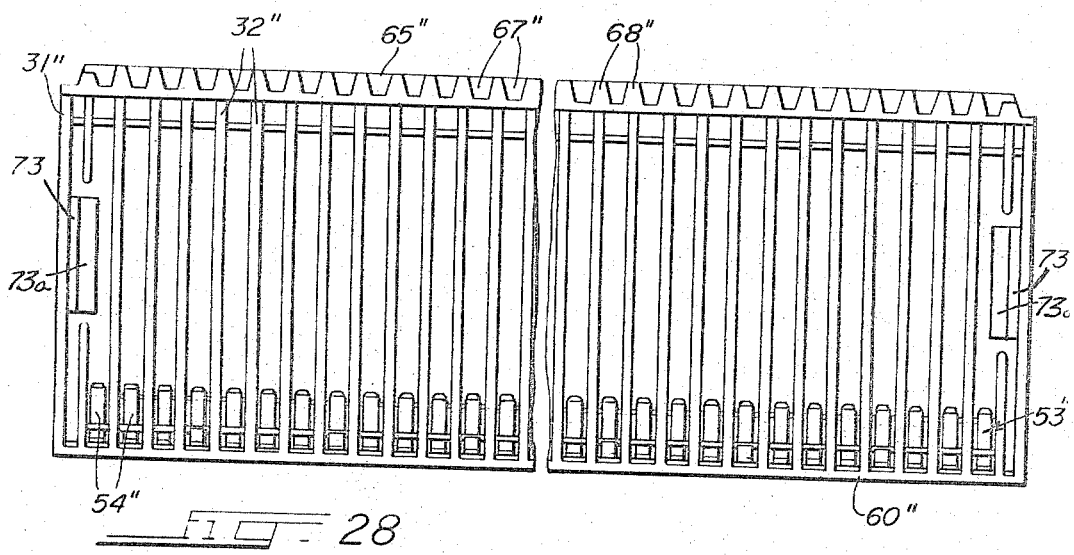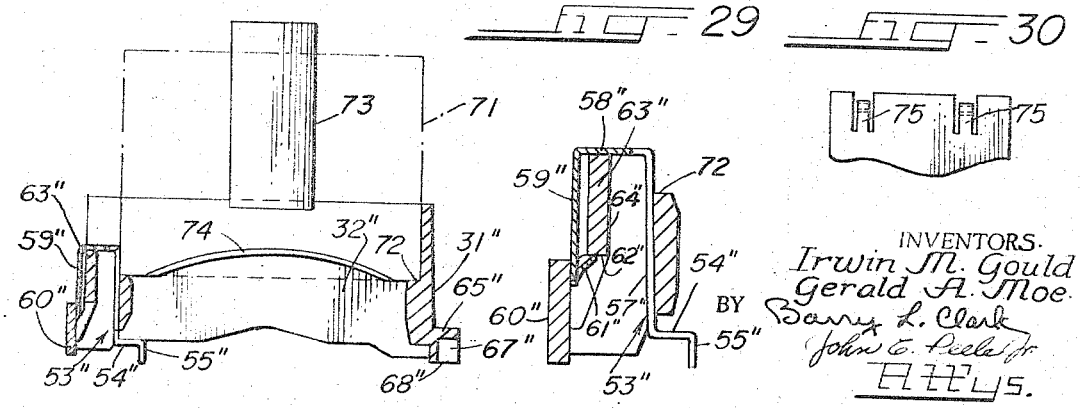

United States Patent Office 3,336,836
Patented Aug. 22, 1967

3,336,836
SLIDE PROJECTOR
Irwin M. Gould, Skokie, and Gerald A. Moe, Buffalo Grove, Ill., assignors to Bell & Howell Company, Chicago, Ill., a corporation of Illinois
Filed June 23, 1964, Ser. No. 377,232
22 Claims. (Cl. 88—28)

The present invention relates to improvements in slide projectors and more particularly concerns a new and improved tray gravity feed slide projector with a previewing cycle.

Prior slide projectors have afforded no means by which the successive slides in a tray or magazine could be automatically successively previewed before projection to enable editing or proper orientation of misoriented slides in the series.

An important object of the present invention is to provide a new and improved slide projector affording novel means for successively previewing each slide of the contents of a carrying tray or magazine before such slide is projected by the usual projection lens onto a screen.

Another object of the invention is to provide a new and improved slide projector having a previewing cycle in an automatic slide feeding and projection sequence.

A further object of the invention is to provide a new and improved automatic slide feed mechanism for projectors in which each successive slide is presented to a previewing station before it is presented to the projection optical system of the projector for projection onto a screen.

Still another object of the invention is to provide a new and improved gravity feed mechanism for slide projectors.

Yet another object of the invention is to provide novel means for controlling gravity feed of slides in a slide projector.

A still further object of the invention is to provide novel cooperative means in a slide projector and on a slide tray or magazine for controlling gravity feed of slides from the tray or magazine.

A yet further object of the invention is to provide a novel tray or magazine having novel yieldable retaining means for slides to be gravity fed in a slide projector.

It is also an object of the invention to provide novel means in a gravity feed projector for adapting conventional slide trays or magazines for use therein.

Still another object of the invention is to provide a novel method and apparatus for loading a series of slides into a slide tray or magazine from a previewing station.

Other objects, features and advantages of the present invention will be readily apparent from the following detailed description of certain preferred embodiments thereof taken in conjunction with the accompanying drawings, in which:

FIGURES 1A to 1H are fragmentary schematic isometric views illustrative of the cyclical sequence in gravity feed, previewing and projection of successive slides from a slide carrying tray or magazine according to the principles of the present invention;

FIGURE 2 is an isometric view of slide projector machine unit embodying features of the invention;

FIGURE 3 is an enlarged sectional elevational detail view taken substantially on the line III—III of FIGURE 2;

FIGURE 4 is a fragmentary top plan view taken substantially on the line IV—IV of FIGURE 3 and showing the operating mechanism of the machine;

FIGURE 5 is a view similar to FIGURE 4 but showing the operating mechanism in another relative orientation;

FIGURE 6 is an enlarged fragmentary sectional elevational detail view taken substantially on the line VI—VI of FIGURE 4;

FIGURE 7 is an enlarged fragmentary sectional elevational detail view taken substantially on the line VII—VII of FIGURE 4;

FIGURE 8 is a sectional elevational detail view looking toward the rear of the operating mechanism and taken substantially on the line VIII—VIII of FIGURE 4;

FIGURE 9 is an enlarged fragmentary sectional elevational detail view taken substantially on the line IX—IX of FIGURE 5;

FIGURE 9A is an enlarged fragmentary sectional detail view taken on the line IXA—IXA of FIGURE 3 showing the septum lock in locking position;

FIGURE 10 is an enlarged fragmentary detail plan view taken substantially on the line X—X of FIGURE 5;

FIGURE 11 is an elevational view showing the slide carrier cam face of the main control cam disk in the operating mechanism;

FIGURE 12 is an elevational view of the opposite face of the main control cam disk showing the slide lifter control cam thereon;

FIGURE 13 is a schematic operating sequence chart for the carrier control cam of FIGURE 11;

FIGURE 14 is a schematic operating sequence chart for the slide lifter cam and certain related operations identified by legends;

FIGURE 15 is an electrical diagram for the control circuitry of the machine;

FIGURE 16 is a schematic illustration of the preview optical system;

FIGURE 17 is a schematic illustration of the projection optical system;

FIGURE 18 is a fragmentary side elevational view, partly broken away and in section, of a slide tray or magazine especially constructed and arranged to use with the projector of the present invention;

FIGURE 19 is a fragmentary bottom plan view of the tray;

FIGURE 20 is a vertical sectional detail view taken substantially on the line XX—XX of FIGURE 18;

FIGURE 21 is an enlarged fragmentary sectional elevational detail view of one of the releasable slide retaining clips of the tray;

FIGURE 22 is a fragmentary side elevational view, partially in section, showing a modification of the tray;

FIGURE 23 is a fragmentary bottom plan view of the modification of FIGURE 22;

FIGURE 24 is a fragmentary vertical sectional view taken substantially on the line XXIV—XXIV of FIGURE 22;

FIGURE 25 is an enlarged fragmentary sectional elevational detail view showing the slide retaining clip structure of the tray of FIGURES 22–24;

FIGURE 26 is a fragmental side elevational view of a slide tray adapter for use with the machine;

FIGURE 27 is a fragmental bottom plan view of the adapter;

FIGURE 28 is a sectional detail view taken substantially on the line XXVIII—XXVIII of FIGURE 26;

FIGURE 29 is an enlarged fragmentary sectional elevational detail view showing the slide retaining spring clip structure; and FIGURE 30 is a fragmentary end elevational view of a modification of the tray adapter.

On reference to FIGURES 1A–1H, an understanding will be gained of the steps followed cyclically in accordance with the principles of the present invention pursuant to previewing and projecting each of a succession of transparency slides 30 carried by a slide tray or magazine 31 provided with septa 32 dividing the tray into separate parallel slide pockets or compartments from which the slides are adapted to be fed downwardly. For such gravity feed, simple, efficient feeding mechanism will suffice. For simplicity and efficiency, the tray or magazine 31 should be mounted above a projection optical means so that the slides 30 can be fed directly from the tray into a previewing and/or projecting position and returned to the tray. In FIGURE 1A, the tray 31 filled with slides 30 in its compartments is placed in the projector and a sequence of operations then takes place. In FIGURE 1B, the first of the slides 30 in the series has been gravity fed downwardly, from where it is moved laterally to the preview or editing position, as shown in FIGURE 1C. After previewing or editing, a reversal of slide movement takes place with return of the slide to the tray as shown in FIGURE 1D.

The tray 31 is then advanced by one slide compartment increment, after which both the number one and the number two slides are gravity fed downwardly as shown in FIGURE 1E and the number two slide moved laterally to the preview or editing position while the number one slide remains in the projecting position and is projected onto a screen, as shown in the orientation of FIGURE 1F. At the beginning of the next cycle, the number two slide is returned into parallel alignment with the number one slide and both of the slides are returned into their respective compartments in the tray 31, which is then advanced by one slide compartment increment. During the same cycle the number two and three slides are gravity fed downwardly as shown in FIGURE 1G, the number two slide remaining in the projecting position and the number three slide moved laterally to the preview or editing position as shown in FIGURE 1H. The cycle can be repeated as desired until all of the successive slides 30 have been previewed and/or projected.

A machine 33 (FIGURE 2) adapted for accomplishing the foregoing automatically comprises a neat, compact unit housed in a casing which conveniently comprises separable, complementary, base and cover shells 34 and 35, respectively. At one side of the top of the cover shell 35 is provided means for supporting and longitudinally reciprocably guiding the slide trays or cartridges 31 and desirably comprising a longitudinally extending depressed track 37. To receive the slides from the cartridge, a transverse slot 38 is provided across the bottom of the track 37 intermediate its ends.

Below the track 37, within the housing is provided a projection optical system including a projection lens 39 extending from the forward end of the housing and having aligned therewith inside the housing a projection lamp 40 (FIGURE 17) behind which is a reflector 41 and in front of which is a set of condensing lenses 42, with the respective slides 30 to be projected by being accommodated between the condensing lenses and the rear end of the projection lens or objective 39.

For previewing or editing, means are accommodated on and within the housing at one side of the projection system area, and comprise a viewing screen 43 mounted in a support 44 which may conveniently be carried on the upper or cover shell 35 of the housing and tilted upwardly toward its forward end so as to be readily viewed by a person standing rearwardly of the machine 33. Within the housing is a suitable preview optical system and illuminating means including a lamp 45 (FIGURE 16), a condensing lens 47 located between the lamp 45 and the position assumed by the slide 30 to be previewed. The illuminated image is then projected by a lens or objective 48 onto a tilted mirror 49 which impinges the image of the slide to be previewed onto the underside of the screen 43 which may be of the frosted translucent panel variety.

Conveniently alongside the previewing mirror location on the upper casing member 35 is a remote control panel 50 (FIGURE 2). At one side of the housing is mounted a carrying handle 51 desirably secured to mating securement bosses 52 formed on the respective casing shell members 34 and 35.

Each of the trays 31 is especially constructed for gravity feed of the slides 30 therefrom. Accordingly, each septum-divided compartment opens upwardly for slide loading and downwardly with controlled retaining means, for gravity feed of slides or slide loading into the tray from the previewing position. Retention of the slides against unintentional dropping from the compartments is effected by means of resiliently flexible spring clips 53 formed from spring metal strip stock and shaped to provide a retaining finger 54 arranged to be disposed in retaining relation to the slide at the bottom of one side of the compartment. A depending terminal lug 55 reinforces the finger and affords a means engageable to spring the retaining finger outwardly to release the associated slide passage thereby in a vertical direction downwardly from the compartment and returned thereto through the bottom slide opening in the compartment. Such slide-clearing displacement of the retaining finger is enabled by a vertical resiliently flexible leg 57 forming part of a generally inverted U-shaped spring clip body structure including an intermediate connecting web 58 and a depending anchoring leg 59 by which the clip is mounted on an integral clip-supporting and slide rail flange structure 60 on the outer side of the adjacent lower margin of the side wall of the tray 31.

To enable assembly of the preformed retaining clips 53 readily by a snap-in manipulation, with positive retention of the clips in their operative position, a lanced-out integral resilient retaining prong 61 is provided on the free terminal portion of the clip leg 59 and projecting upwardly and inwardly so as to engage retainingly with a downwardly facing anchoring shoulder 62 provided on an inset upper portion 63 of the magazine rail structure. Thereby, assembly of each of the clips 53 is readily effected by introducing the finger portion 54 into the upwardly opening end of a clearance space 64 provided between the anchoring portion 63 and the adjacent side wall of the tray and then moving the clip downwardly into assembled position. Inward spring tension on the spring arm or leg 57 is assured by initially forming the anchoring leg 59 to extend at an angle outwardly and in the course of effecting assembly, springing this leg inwardly to clear the upper edge of the lower outwardly offset portion of the rail 60 which is spaced from the shoulder 62 to provide a gap into which the inwardly sprung leg 59 is guided during assembly, with the resilient retaining prong 61 suitably sprung toward the anchoring leg by pressing it against the adjacent outer wall of the anchoring portion 63 until the anchoring prong clears and snaps inwardly into engagement with the shoulder 62 as shown in FIGURE 21. Thereupon, the anchoring portion or web 63 is gripped firmly between the intermediate connecting web portion 58 of the clip and the retaining prong 61. By tending to spring back toward its initial position, the anchoring leg 59 of the clip thrusting against the inside of the lower rail portion 60 biases the spring arm 57 firmly toward and into engagement with the opposing face of the lower marginal portion of the side wall of the magazine 31 defining the clearance space 64. This normally maintains the slide retaining finger 54 as an upwardly facing shoulder to engage the lower edge of a slide in the associated slide pocket compartment of the tray. However, when it is desired to release the slide downwardly, pressure applied to the downwardly projecting terminal 55 in an outward direction correspondingly flexes the leg 57 until the finger 54 clears the wall of the tray and permits the slide to drop.

Along the opposite lower side margin of the tray 31 is a longitudinally outwardly projecting integral rail flange 65 which is generally complementary to the clip supporting rail flange 60 along the opposite side and adapted to support the tray for slidable movement along the track 37 of the machine. In addition, the rail flange 65 provides means for indexing the tray to register the respective slide compartments with the tray receiving slot 38. For this purpose, the rail flange 65 is provided with outwardly and downwardly opening indexing notches 67 aligned with the respective slide compartments and respectively divided by integral teeth 68. As will be observed in FIGURE 19, the teeth 68 at each opposite end of the series are preferably shorter than the remaining teeth as indicated at 68a to afford initial end clearance, facilitating engagement of indexing mechanism in the endmost respective indexing notches 67.

In the modification of FIGURES 22–25, most of the functional details are much the same as described for the tray as depicted in FIGURES 18–21 and similar parts are identified by primed reference numerals. In this modification, the tray 31' is especially adapted for larger capacity than conventional trays which are customarily equipped with thirty slide pockets or compartments. In a practical arrangement, the tray 31' may be of a length to accommodate double the usual number of slides, namely up to sixty. Moreover, in this tray 31', the dividers or septa 32' instead of being notched out from the top as depicted for the septa 32 in FIGURE 20 are notched out from the bottom, and at their tops are provided with means for gauging the thickness of slides to be inserted into the respective compartments, thus avoiding inadvertent loading of the tray with anything but slides of a predetermined maximum thickness and preventing possible jamming. For this purpose, the uppermost portions of the respective dividers or septa 32' are provided with fragmentary upwardly projecting marginal thickened gauging portions 32a adjacent one side of the tray and providing a gauging gap therebetween which is just wide enough to receive the proper thickness of slide while the major compartment gap is wider to afford more clearance and greater freedom of insertion and removal movement of the slides.

In order to prevent accidental dislodgment of the slides from the top openings of the slide compartments of the tray 31', a releasable slide lock 69 is provided, which conveniently comprises a generally inverted U-shaped strip or thin bar, the main portion of which is as long as the tray 31' and having at its opposite ends respective engagement legs 69a pivotally secured at 69b to the end wall of the tray adjacent to the opposite side from the gauging projections 32a and adapted to be swung from a clearance position at the adjacent side of the tray into overlying position to the slides in the tray to lock the slides against upward displacement. In the locking position thereof, the leg 69a of the locking bar 69 engage against limit stop lugs 70 on the respective opposite end walls of the tray. A suitable frictional binding of the legs 69a against the adjacent end walls will serve to hold the locking bar 69 in the locking position until it is deliberately swung laterally into the slide-releasing position.

A modified slide-retaining spring finger structure 53' is provided in what may be referred to as a generally comb strip structure which is adapted to be molded from suitable synthetic plastic such as Delrin acetal resin. In this form, the retaining fingers 54' with their depending terminals 55' are carried by respective resiliently flexible legs 57' attached to the intermediate portion which in this instance comprises a bar-like body member 58' of suitable length carrying a substantial plurality of the finger clips. For connecting the body 58' to the attachment portion 63' of the tray rail 60', the depending anchoring leg 59' has a portion which engages the outer side of the tray rail portion 63' and an inner depending leg portion 59a engaging the inner side of the tray rail. Anchoring is effected by providing on the upper inner corner of the tray rail portion 63' a shoulder rib 62' which engages retainingly in a groove defining an interlock shoulder 61' at the upper end of the anchoring leg portion 59a. Through this arrangement, assembly of the retaining clip structure 53' is readily effected by inserting the spring portions downwardly into the clearance gap 64' and flexing the spring legs 57' against the outer face of the adjacent side wall of the tray 31' as shown in FIGURE 25 and then, by continuing downward assembly movement of the spring unit, engagement of the upper edge portion of the rail part 63' in the groove between the inner and outer portions of the leg 59' effects interlocking engagement of the shoulders 61' and 62'. In the final assembly, the retaining fingers 54' project inwardly into intercepting relation to respective slides in the compartments between the dividers or septa 32'.

Along the opposite side of the tray 31' from the rail 60' is provided the rail 65' having the notches 67' separated by the tooth-like dividers 68'.

Because the user of the machine may have slides already housed in conventional slide trays, an adapter tray 31" is provided which is constructed essentially similar to the principal tray 31 except that it is shallower and adapted for receiving an existing, standard or conventional type of slide tray 71 (FIGURES 26 and 28) having only one access or slide displacement opening into the respective slide compartments. To this end, the adapter tray 31" has the walls thereof constructed to receive the conventional tray 71 therein in an inverted position and resting on a shoulder 72 (FIGURES 28 and 29). Means for retaining the tray 71 assembled with the adapter tray 31" comprise suitable latch means, conveniently in the form of a resiliently flexible latch arm 73 (FIGURES 26–28) projecting upwardly from each opposite tray end and each having a latch dog shoulder 73a engageable with the adjacent bottom edge of the tray 71 to hold it against unintentional displacement from the adapter tray. Respective cam faces 73b on the inner sides of the latch dogs 73a facilitate spring snap-on assembly of the adapter tray by general alignment of the adapter tray 31" over the tray 71 held open-side toward the adapter and then pressing the latches 73 past and along the ends of the tray 71 until the shoulder 72 seats on the edge of the tray 71 and the latch dogs 73a snap into retaining relation of the opposite end edges of the tray 71.

Upon inverting the assembled adapter tray 31" and the conventional tray 71, the slides in the respective slide compartments of the tray 71 drop partially from the tray 71 into aligned compartments in the adapter tray 31" provided by respective dividers or septa 32" which, in this instance, have their upper edges constructed to conform generally to the outer edges of the dividers or septa of the tray, as shown in FIGURE 28 and preferably provided with non-angular, generally rounded and slightly bulbous cross-section respective edge formations 74 to avoid catching of the edges of the slides thereon. On dropping into the slide compartments of the adapter tray 31", the slides are supported against unintentional dropping out of the open bottom ends of the slide compartments by retaining clips 53" essentially the same as the retaining clips 53 of the main or independent trays 31. That is, retaining fingers 54" of the retaining clips engage the adjacent lower ends of the slides but are adapted to be sprung out of retaining relation by pressure against the respective depending terminals 55" thereof to swing the resiliently yieldable respective legs 57" thereof outwardly in the clearance space 64".

While the rail rib and clip supporting structure 60" of the tray 31" may be essentially the same as the corresponding structure of the tray 31, in this instance alternatively or by preference the clips 53" may be integrally connected in comb-like relation by having the same project from one side of a strip in which the connecting web leg portions comprise a continuous flange 58" (FIGURES 28 and 29) and the anchoring leg 59" is also a continuous flange, with retaining prongs 61" struck out only at a few spaced intervals, so that the inset portion 63" need have only a corresponding few of the anchoring shoulders 62". Assembly and functioning of the clips 53" with the adapter tray 31″ is effected substantially the same as hereinbefore described in connection with the clips 53 and the tray 31. Similarly, the adapter tray 31″ is provided with an opposite marginal combination slide rail and indexing means 65″ provided with indexing notches 67″ divided by generally wedge-shaped teeth 68″.

One of the adapter trays 31″ can service a succession of the conventional trays 71, it being a simple matter to detach the adapter tray from one of the trays 71 for assembly with another. When it is desired to remove the adapter tray from the attached tray 71, the assembly is inverted to return the conventional tray 71 to an upwardly opening position. Thereby the slides all drop from their partially projected positions in the adapter tray back to normal position within the tray 71. Then, by springing the latches 73 free from the tray 71 through a simple digital manipulation, the adapter tray 31″ can be lifted away and assembled with another one of the conventional, loaded trays 71.

In the modified adapter tray structure as shown in FIGURE 30, instead of retaining spring latch members projecting beyond the upper edges of the ends of the adapter tray, one or more, and in this instance a pair of laterally spaced shorter and narrower resiliently flexible retaining finger-like latch arms 75 may be provided on each end wall of the adapter tray and constructed essentially similar to the resilient latch elements 73. Since conventional slide trays are customarily provided with a shouldered ledge or rib on their end walls convenient for engagement by the resilient latch elements 75 at a location below the top edges of the end walls of the adapter tray, this enables locating the free ends of the spring latches 75 within the plane of the adjacent end wall edge and also within the outer plane of such end wall and thus protected against damage from careless handling of the adapter tray.

In respect to both of the forms of retaining spring latch 73 and 75, while they may be formed of spring metal and attached to the respective adapter trays, where the material from which such trays are constructed is possessed of inherent resiliency, the latches are desirably constructed integrally with and from the same material as the tray. For example, such trays are commonly molded from a suitable synthetic plastic material such as styrene, which readily lends itself to this type of integral molded construction.

Referring now to FIGURES 3, 4 and 5, apparatus is housed within the casing of the machine 33 for indexing the slide tray 31 (or 31′ or 31″, as the case may be) to effect successive registration of the slide compartments thereof with the receiving slot 38 across the tray track 37 of the machine; to release the respective retaining fingers of the retaining clips 53; and to transport the selected slides 30 through a full cycle, including gravity feed, previewing, projection, and return to the slide tray. To this end, mechanism-supporting framework is mounted within the ample mechanism chamber afforded by the shell housing and preferably constructed and arranged to afford as nearly as practicable sub-assembly units to be conveniently bench-assembled and installed in the machine. This includes a vertically standing horizontally elongated frame panel or plate 76 having a right angular lower marginal foot flange 77 secured as by means of screws 78 to upstanding attachment bosses 79 rising from the base wall of the lower casing shell 34 and extending transversely across the mechanism chamber in proper orientation adjacent to and below the receiving slot 38.

Adjacent to one end of the slot 38, slide tray indexing means 80, comprising a suitable gear cluster, is mounted on a suitable horizontal mounting flange portion 81 on the mechanism plate 76. These gears include a large toothed indexing pinion 82 which projects peripherally into the side of the tray track 37, properly oriented with respect to the slot 38 and engages the indexing notches 67 of the tray 31, in the manner of a rack and pinion. A pressure-releasable, click-type resiliently biased over-run preventing detent 82b engages with the teeth of the indexing pinion. For advancing the indexing pinion 82 by one tooth increments, a forwardly driving gear 83 has a one-revolution tooth 84 on a hub 85 disposed for meshing with and advancing the pinion 82 in each revolution of the driving gear. Reverse incremental indexing of the tray is effected by a gear 87 which is the counterpart of the advancing gear 83 and has a hub 88 provided with a one revolution tooth 89 and driven in the opposite rotary direction through meshing gears 90 and 91 which respectively mesh in driven relation with the advancing gear 83 and the reversing gear 87.

While the indexing pinion 82 and the transmission gears 90 and 91 are mounted rotatably in suitable manner directly on the supporting flange 81, the advancing gear 83 is fixed corotatively on the upper end portion of a drive shaft 93 and the reversing gear 87 is mounted relatively rotatably on the same shaft but supported in a fixed axial direction thereon. By vertically shifting the shaft 93 dis-engagement of the advancing gear and engagement of the reversing gear with respect to the indexing pinion 82 can be effected. For this purpose, the shaft 93 extends downwardly through the supporting flange 81 (FIGURES 8 and 9) and has biasing means normally urging it in the direction to maintain the advancing gear in mesh with the indexing pinion, in the present instance downwardly. Suitable means for this purpose comprise a coiled compression spring 94 thrusting upwardly against the underside of the flange 81 and downwardly against a collar 95 mounted on an intermediate portion of the shaft.

When it is desired to reverse the indexable movement of the slide tray, the shaft 93 is shifted upwardly against the bias of the spring 94 sufficiently to disengage the advancing gear 83 and engage the reversing gear 87 in respect to the indexing pinion 82. This is conveniently effected by means of a solenoid 97 suitably mounted adjacent to the shaft 93 on a frame part or bracket 98 to which is pivotally mounted a bell-crank 99 having one arm operatively engaged with the armature of the solenoid and its other arm provided with a presser finger 100 engageable with the underside of the thrust collar 95 when the solenoid 97 is energized to thrust the shaft 93 upwardly into the reverse driving relation. Through this arrangement, although the shaft 93 is driven in one rotary direction, both forward and reverse indexing of the slide tray is accomplished.

Driving of the indexing shaft 93 is effected through a helical gear 101 mounted on the lower end portion of the shaft between vertically spaced bearing portions of a bearing bracket 102 and meshing with a driving worm 103 carried by a horizontal shaft 104 having its adjacent end portion journalled in the bracket 102. This drive shaft 104 extends in spaced relation across the back of the mechanism mounting plate 76 and has its opposite end portion journalled in a bracket flange 105 on the opposite side of the plate 76, as best seen in FIGURES 4 and 8.

In order to avoid damage to the mechanism and more particularly the driving means, should there be a jamming of the indexing means, coupling of the driving gear 101 with the shaft 93 is effected through an automatically releasable safety clutch. For this purpose, the gear 101 is mounted in freely rotatable relation on the shaft 93, and rests at its lower end on a clutch disk 107 having one or more teeth 108 releasably engaging in corresponding notches 109 in the opposing clutch face of the gear 101. Corotational but freely axial relative sliding movement of the clutch plate 107 on the shaft 93 is effected by providing the shaft with a longitudinal flat 110 with which the clutch plate is keyed through its D-shaped bore. Normally, the clutch plate 107 is held in clutching coaction with the gear 101 by resilient biasing means comprising a coiled compression spring 111 encircling the lower end portion of the shaft 93 and thrusting at its lower end against a lower bearing flange of the bracket 102 and at its upper end against the clutch disk 107. Upward movement of the gear 101 is prevented by engagement of its upper end with the upper bearing flange of the bracket 102. Should there be undue resistance to rotation of the shaft 93, the clutch disk 107 will be caused to disengage from the driving gear 101 while the latter is driven rotatably, as permitted by yielding of the spring 111. Since the shaft 93 is freely slidable in the gear 101 and the clutch disk 107, the gear 101 remains in mesh with the driving worm 103 when the shaft 93 is shifted upwardly for reverse indexing of the slide tray.

Driving of the drive shaft 104 one revolution at a time coordinated with each cycle of slide handling is accomplished through a helical gear 112 (FIGURES 7 and 8) mounted thereon adjacent to its end journalled in the bracket flange 105. Meshing with the helical gear 112 is a helical transmission gear 113 mounted on a shaft 114 journalled at its forward end portion in the mounting plate 76 and extending rearwardly therefrom and having its opposite end portion journalled in a mounting frame bracket structure 115. Adjacent to one end, the elongated helical gear 113 has a peripherally projecting follower slide 117 which slidably engages in dwell relation with the predominantly cylindrical perimeter of a relatively large diameter cam disk 118 having on a predetermined segment of such perimeter a series of gear teeth 119 with drop-in notches at each end for the lead and trailing fingers of the dwell slide. Meshing of the teeth 119 with complementary gear teeth on the gear 113 rotates the gear 113 one revolution in each full revolution of the cam disk.

Mounting of the cam disk 118 is on a front-to-rear shaft 120 journalled at its forward end portion on the mounting plate 76 and at its rear end portion in an elongated barrel clutch hub 121 of a transmisison gear 122. The latter is journalled in the bracket 115 and meshes with a gear 123 mounted rotatably on a shaft 124 on the bracket 115 and having a helical gear portion 125 which meshes with a driving worm 127 mounted on an upwardly extending portion of a drive shaft 128 of an electrical driving motor 129 (FIGURES 4, 6 and 7). A downwardly extending portion of the drive shaft is drivingly connected to a cooling fan 129a.

In order to permit continuous running of the motor 129 but single cycle actuation and selective indeterminate dwell of the operating mechanism, a normally disconnected clutch is interposed between the cam disk shaft 120 and the power gear train. Conveniently such clutch comprises a coiled spring clutch member 130 coiled about the gear drum 121 and having one terminal 131 anchored to a collar 132 rigid with the shaft 120. Normally, this spring clutch 130 tends to grip the drum 121 corotatively, but on opposite terminal 133 of the clutch spring projects radially outwardly to engage a stop bar 134 which is mounted reciprocably to project normally into the path of the clutch terminal 133 whereby to stop rotation of the spring clutch with the clutch drum 121 and effecting declutching torque expansion of the spring. Selective retraction of the clutch-disabling stop bar 134 is effected by means comprising a solenoid 135 mounted on the bracket 115 and having its armature 137 operatively connected to the stop bar 134. Normally, the armature 137 and the declutching stop bar 134 are biased by means comprising a compression spring 138 to project the bar 134 into the declutching position in the path of the clutch terminal 133.

Mounted on the mechanism plate 76 and operatively controlled by the cam disk 118 are slide handling mechanisms. These include a vertical slide carrier comprising a preferably rectangular frame 139 mounted for horizontal reciprocation along the back face of the mechanism plate 76 between a slide previewing position (FIGURES 3, 4 and 8) and a slide receiving position (FIGURES 5, 9 and 10). On its lower margin along its face adjacent to the mounting plate 76, the carrier frame 139 has slide supporting means comprising flange means 140 providing upwardly opening slot or trough 141 receptive of the lower margin of one of the slides 30 to be previewed and with the framed transparency area of the slide in substatially centered alignment with a larger area aperture clearance 142 afforded by the carrier frame. In the previewing position of the carrier frame, this aperture area and the aperture framed by the slide are substantially centered in alignment with a previewing aperture 143 through the supporting plate 76. Mounting of the carrier 139 for transportation between the previewing and slide receiving limits of reciprocable movement is conveniently accomplished by providing on the lower margin of the frame a horizontally elongated guide flange 144 equipped with fixed horizontally spaced eye bearings or sliders 145 slidably engaging the drive shaft 104 therethrough which thus provides a supporting and guide track for the carrier. A guide for the upper portion of the carrier 139 is provided by a horizontally extending guide flange 147 attached to the inner face of the mounting plate 76 and engaged by a guide finger flange 148 on the carrier frame.

Cyclical reciprocations of the carrier 139 are effected by the cam disk 118 through a cycling cam 149 (FIGURES 4, 8 and 11) on the back face of the disk. Rotary motion of the cam disk in translated into reciprocatory motion through a sector gear 150 suitably rockably mounted adjacent to the back of the cam disk by means of a hub 151 extending rearwardly on the sector pivotally engaging a stub shaft 152 (FIGURE 7) carried by and projecting forwardly on the bracket structure 115. An upwardly extending follower arm 153 on the sector 150 has a follower 154 in engagement with the periphery of the control cam 149. On its lower edge, the sector has gear teeth 155 meshing with a drive gear portion 157 of a slide carrier actuating pinion 158 mounted on a shaft 159 journalled in the mechanism plate 76 and meshing with the teeth of a downwardly facing rack 160 on the carrier guide flange 144. Biasing means conveniently in the form of a torsion spring 161 (FIGURES 4 and 8) encircles the shaft 159 and has one end anchored to the mechanism plate 76 and the opposite end anchored to the pinion 158 under torsional loading normally urging the carrier drive pinion counterclockwise as seen in FIGURE 8 and thus biasing the sector 150 to maintain the follower 154 constantly in the following engagement with the carrier cycling cam 149.

In each revolution of the cam disk 118, the carrier control cam 149 causes the sector 150 to drive the pinion 158 to effect a cyclical traverse of the slide carriage 139 from the preview position to the slide receiving and exchange position and return. One such complete cycle is depicted in FIGURES 11 and 13 oriented with respect to the zero position depicted in FIGURE 8 wherein the carrier is in the preview position. During the first thirteen degrees of rotary movement of the cam disk 118 relative to the follower 154, the carriage remains stationary or in dwell relation at preview. During the next sixty degrees of cam disk rotation, there is a rapid advance of the slide carriage 139 into the slide exchange and receiving position under the respective slide tray mounted in the track 37 and indexed in respect to the clearance slot 38. There, the carriage 139 remains in a dwell or stationary position during about 197° of cam movement while the previewed slide is returned to the tray and a succeeding slide is delivered into the carrier. In the final ninety degrees of rotation of the cam disk 118, the carrier 139 is returned to the preview position.

As the sector 150 makes one complete rocking cycle as controlled by the cam 149, with corresponding oscillation of the pinion 158 and its shaft 159, a shutter controlling cam disk 162 (FIGURES 3, 4 and 5) mounted on the forward end portion of the pinion shaft 159 and located on the forward side of the mechanism plate 76, alternately moves a shutter 163 into blocking or closing relation across the front of the projection aperture area and returns the shutter to non-operating or open position. For this purpose, the shutter 163 is carried by a shutter arm 164 extending across the outer face of the cam disk 162 and pivotally mounted on a stub shaft 165 projecting forwardly on the mechanism plate 76. Intermediately the shutter arm 164 has a follower shoulder bend 167 which engages an actuating cam structure 168 on the front face of the cam disk 162. Through this arrangement, when the cam disk 162 rotates oscillatably in a clockwise direction, as seen in FIGURES 3 and 5, the shutter arm 164 is raised and when the cam disk 162 returns in the opposite rotary direction the shutter arm 164 is lowered. Normally, the shutter arm is biased downwardly toward its lower position by means such as a tension spring 169.

Should it be desired, for editing purposes or otherwise, to move the shutter 163 into its operative projection aperture area blocking position out of normal cyclical sequence, a manual shutter actuating lever 170 is adapted to be actuated. This lever extends in a generally vertical direction, is provided with a downwardly facing shoulder 171 which overlies the adjacent end portion of the shutter arm, is vertically reciprocably guided by a stud 172 projecting forwardly on the mechanism plate 76, and has a digitally engageable upwardly projecting upper end button 173 extending up within the recess 50 in the upper casing shell 35 of the housing. When it is desired to close the shutter 163, simple downward digital pressure on the lever button 173 causes the shoulder 171 to rock the shutter arm 164 to move the shutter into closing position. When the button 173 is released, the shutter spring 169 snaps the shutter open.

Another function of the master cam disk 118 is to actuate means for gravitationally delivering slides from the overhead tray and returning slides thereto. For this purpose, the master cam disk 118 has on its forward face opposing the mechanism plate 76 a lifter cam 174 with which is engaged a follower 175 projecting rearwardly through a plate aperture 176 from a lifter arm 177 attached pivotally at one end as shown at 178 to the mechanism plate in clearance relation below the preview aperture 143 and behind the shutter control cam disk 162. A distal hook-shaped end portion 179 on the lifter arm carries a slide-engaging generally upwardly directed tip 180. Conveniently, this tip 180 comprises a separately formed member, as best seen in FIGURE 9, suitably attached to the end portion of the lifter arm carrying the same. Location of the lifter tip 180 is normally as nearly as practicably centered below the projection aperture area, generally defined by an opening 181 in the mechanism plate 76 and having its lower end portion recessed downwardly to afford clearance through which the lifter tip 180 projects rearwardly from the lifter arm mounting end through the mechanism plate into proper position under the slide receiving slot 38 in the tray guide track 37. Thereby, the lifter tip 180 is adapted to be raised and lowered between a lower between-cycle, inactive position as shown in FIGURES 3, 4, 8 and 9, and an upper slide receiving or returning position relative to the bottom of one of the trays 31 indexed in the tray track 37, FIGURES 5 and 9.

Because the lifter arm 177 is of relatively great length between its pivoted end and its lifter tip end, suitable intermediate guide means therefor are provided. Desirably, such guide means comprise an arcuate guide track flange plate member 182 secured to the front face of the mechanism plate 76 between the previewing and projecting aperture areas. A guide roller 183 rotatably mounted on the lifter arm 177 rides the guide track or rail provided by the member 182. This stabilizes the lifter arm and assures substantially accurate registration of the lifter tip 180 with the slides handled thereby.

Biasing means such as a tension spring 184 (FIGURES 3 and 5) urges the lifter arm 177 to swing about its pivot 178 in one direction, in this instance in an upward direction, whereby the follower 175 rides firmly against the lifter control cam 174 which is contoured to drive the lifter through a full cycle of operation in each complete rotation of the cam disk 118 and in timed, coordinated relation to the slide carrier 139. As viewed in FIGURES 3 and 12, the cam 174 and the follower 175 are in the ready, at rest, or starting position which is indicated in FIGURES 12 and 14 as at zero.

During about the first eighty-five degrees of rotation of the cam disk 118, a dwell or inactive position of the lifter arm is maintained. During approximately the following sixty-four degrees of cam disk rotation, and after the carrier 139 has reached its slide returning/receiving position under the indexed tray, the lifter is raised. It then remains in the fully raised position for about the next twenty-four degrees of rotation of the cam disk and then in about the next sixty-four degrees of cam disk rotation the lifter is lowered. Such raising and lowering of the lifter occurs while the carrier remains in a stationary or dwell position under the slide tray. Then through the remander of the cycle of rotation of the cam disk 118 to the starting position, the lifter remains in its inactive lowered position.

Means are provided for supporting the respective slides in the projection position and so constructed and related to the preview slide carrier as to serve as means for positively guiding slides raised from or lowered to the carrier by the lifter tip 180. In a practical form, such means comprise a generally inverted U-shaped flat septum lock frame and projection aperture plate member 187 of a width to fit within the substantially oversize projection aperture opening 181 (FIGURE 8). Attached to the front face of the projection aperture frame 187 is a complementary frame plate 188 which at the lower side of the aperture frame provides an upwardly facing slide supporting shoulder 189. At the lower front opposite side of the frame plate a generally complementary facing plate 190 provides a complementary upwardly facing slide retaining shoulder 191 in a horizontal plane with the shoulder 189. In addition, the facing plate 190 together with the side edge portion of the frame plate 187 provides a flanged guide vertically slidably engaging the adjacent vertical side edge portion defining the aperture 181 in the mechanism plate. At its side, the frame member 187 has a pair of vertically spaced laterally and rearwardly extending flange lugs 192 fixedly attached to a vertical rod 193 in sliding bearing engagement through suitable bearing apertures in the upper mechanism plate bracket flange 81 and through the upper flange of the bracket 102. At its lower end, the guide rod 193 projects downwardly into engagement with a timing cam 194 fixedly attached to longitudinal shaft 104 for controlling the vertical position of the frame 187.

Normally, the frame plate 187 is maintained by the cam 194 in its uppermost position to lock the indexed tray, with the septum 32 which separates the slide to be projected and the slide to be previewed in substantially accurate vertical alignment with a separating cross bar 195 at the top of the frame. This cross bar has its upper edge 197 tapered substantially knife edge fashion to oppose a complementary susbtantially knife edge tapered lower margin 198 on the opposing septum. Closely aligned opposition of the tapered edges 197 and 198 is assured by engagement of opposite end portions of the septum marginal edge 198 in respective V-shaped upwardly opening locking grooves 199 and 200 (FIGURES 4, 9 and 9A) on opposite end portions of the top edge of the frame 187.

A second function of the frame plate 187 in its normal upper position comprises activation of a releasing device for the slide-retaining spring fingers. Herein this device comprises an upwardly extending lever 201 (FIGURES 3 and 4) having on its lower end portion a pivotal connection 202 to the mechanism plate 76 along the right side of the opening 181. Normally, the lever 201 is biased by means such as a spring 203 toward the adjacent side of the frame member 187 so that a laterally extending cam projection 204 on the lever overlies a kick-out dog 205 on the frame member in its lowered position (FIGURE 5). Upon raising of the frame member 187, the dog 205 cammingly acting against the cam projection 204 swings the lever 201 against the spring bias and drives a finger-releasing flange 207 on the upper end of the lever against the depending terminals 55 of the two retaining fingers of the cartridge aligned with the slide compartments respectively indexed over the slide carrier 139 positioned thereunder and the supporting shoulders 189 and 191 on the aperture frame 187. In the fully raised position of the frame 187, the finger-releasing flange 207 completely clears the two spring fingers engaged thereby from retaining engagement with the respective slides 30 and such slides are engaged by the lifter tip 180. Lowering of the septum lock 187 to release the slide tray is timed by the cam 194 to occur when the lifter finger tip 180 is in its uppermost position (FIGURES 5 and 9) and automatic indexing of the tray is effected through driving of the shaft 104 through the segmental gear portion 119 on the master cam disk 118. This is schematically shown in FIGURE 14, as occurring in the master cam disk rotary cycle segment between about 149° and 190°. It will be observed that this overlaps the up position dwell of the lifter as controlled by the cam 174.

As best seen in FIGURES 9 and 10, the lifter finger 180 has an upwardly opening clearance notch 208 which is deep enough to clear the head cross bar 195 of the frame 187 while the lifter tip is in its raised position at the slide-receiving level.

In order to assure that each successive slide to be projected is as nearly as practicable in focus, while nevertheless affording ample clearance for free and unobstructed feed-in and return movements of the slides by means of the lifter arm and tip 180, releasable means are provided for pressing the slides to be projected against the forward face of the septum lock and projection frame plate 187. For this purpose, the frame plate defines a projection aperture 209 (FIGURES 3 and 8) which is large enough to assure ample clearance about the projection aperture defined by the slide frame, but affords a flange area about the sides and top of the aperture 209 to provide a film backing for the slide.

In a desirable form, such pressing means comprise releasable spaced pressure pads or shoulders 210 and 211, respectively, as best seen in FIGURES 4 and 10, opposing the plate 187 adjacent each side and above the aperture 209. These pressure shoulders are coordinated to move into and out of slide-pressing engagement together and in correlation with the cyclically operated slide handling mechanism. Thus, the shoulder 210 comprises a terminal tip on an arm member 212 and the pressure shoulder 211 comprises a projection on a longer arm 213. These arms have segmental gear heads 214 which are in mesh and are pivotal about the respective axes of pivotal connections 215 to a supporting bridge bracket structure 217 provided across the top of the facing plate 188.

Normally, the pressure shoulders are biased toward the coordinated slide pressing position thereof by means such as a tension leaf spring 218 thrusting rearwardly against an intermediate portion of an extension 219 on the arm 213. This extension also includes a generally rearwardly extending releasing finger 220 which projects into the path of a shifting dog or projection 221 provided for this purpose on the adjacent side of the slide carrier 139. Through this arrangement, when the slide carrier 139 is in slide-receiving position aligned with the septum lock and aperture frame plate 187, the pressure shoulders 210 and 211 are released by coordinated swinging of the arms 212 and 213 to the releasing position by engagement of the finger 220 by the releasing dog 221. After the slides have been delivered into the carrier 139 and into the receptacle provided by the plates 187 and 188, and the carrier 139 returns to preview position, the shoulders 210 and 211 automatically assume the slide pressing relationship under the biasing tension of the thrust spring 218.

Anytime a slide has been transported to the previewing position by the carrier 139 and for any reason it becomes desirable to remove it, such as for editorial purposes or to effect proper image orientation, a lift-out device is adapted to be activated. Although such a device might be power actuated, a simple manual arrangement comprises a generally L-shaped lever 222 (FIGURES 2, 3 and 4) having its vertical leg reciprocably guided in adjacent spaced relation to one side of the previewing aperture 143 and along the front of the mechanism plate 76 by means of a pin 223 on the plate and extending through a vertical guide slot 224 in the lever leg. Along the upper margin of the mechanism plate lanced and turned out guide flanges 225 stabilize reciprocal movements of the lever. At its upper end, the lever has a suitable manual actuating terminal which may be in the form of a flange 227 which extends a suitable distance upwardly from the adjacent surface of the housing cover 35 to be conveniently engaged. By pulling upwardly on the handle flange 227, the lever 222 is raised and its lower shorter leg or arm carrying a rearwardly extending lifter flange 228 extending through a vertical slot 229 opening through the lower edge defining the aperture 143 engages under the lower edge of the slide 30 and lifts it upwardly through an ejection slot 230 above and aligned with the carrier 139. The same or another slide can be dropped through the slot 230 into the carrier. In fact, if desired, the slot 230 and the ejector lever 222 may be used for previewing a series of slides manually if desired.

Should it be desired to shift the tray 31 rapidly for skip projection or to remove it after only a certain selected group of slides therein have been cycled through the machine or to remove a partially filled tray after its slides have been projected, and the like, the normal automatically complete cycle of operation controlled by the master cam disk 118 is adapted to be interrupted at that point in the cycle where the septum lock 187 is released and the indexing gear 82 is free to rotate in response to longitudinal manual sliding actuation of the slide tray. Conveniently such interruption of the automatic cycle is arranged to be effected by means of what may be termed a half-cycle stop device including a knob 231 (FIGURES 2, 4, 6 and 7) conveniently accessible on top of the cover 35 and attached to a vertical shaft 232 oscillatably mounted at its lower end portion in frictional resistance relation on a horizontal bracket flange 233. Corotatively attached to the lower end portion of the shaft 232 is a stop arm 234 having a terminal flange portion 235 located to be swung from a position wherein the stop terminal is out of the path of the spring clutch terminal 133 as shown in full outline into a stop position as shown in dash outline in FIGURE 4. In this latter position, the spring clutch terminal 133 is engaged by the stop flange 235 after about 169° of rotation of the master cam disk 118 and at that point in the cycle of operation wherein the lifter finger is in the up position, the carrier tray is in the receiving position, the septum lock is released, and indexing of the tray has not yet been effected, as indicated in the cycle chart of FIGURE 14. Turning of the half-cycle stop finger 234 to release the clutch terminal 133 results in completion of the cycle of operation.

For cycling power operation, a simple electrical control circuit is provided as shown in FIGURE 15, including the customary electrical cord having a plug 237 by which the circuit is connected into a power line such as an ordinary 110-volt house circuit. A master control switch 238, desirably of the three position type and shown in the "off" position is arranged to be operated sequentially to close the circuit through a first contact 239 by which the preview lamp 45 and the drive motor 129 are energized.

In this instance, the drive motor is of the shaded pole variety so that its coils are available for stepped down voltage source as for the preview lamp 45 and the control solenoids 97 and 135 as well as a focusing motor 240. With the switch 238 closing only the contact 239 previewing may be effected either cyclically or manually while the projection lamp 40 remains dark. By further shifting the master switch 238 to close also a contact 241 for completing and energizing circuit through the projection lamp 40, projection and previewing are accomplished in each operating cycle.

Cycling is controlled through a manually actuated normally open switch 242 which, when closed energizes the cycling solenoid 135 to release the clutch 130.

Should it be desired to reverse indexing of the slide tray, that is effected through a manually operated switch 243 which controls the index shifting solenoid 97.

Motorized focusing of the projection lens 39 is adapted to be accomplished through the reversible motor 240 controlled by a normally open forward focusing switch 244 and a normally open reverse focusing switch 245.

Manual buttons or knobs or levers for the respective switches, similarly identified, are conveniently mounted on a panel 247 carried in the recess area 50 on the cover 35 of the machine housing (FIGURE 2).

In operation of the machine 33, before or after the electrical circuit has been connected into a power line through the plug 237, one of the slide trays 31 or its counterpart adapter tray is mounted in the track 37 and the forward end of the tray is placed in position adjacent to the receiving slot 38 and the indexing gear wheel 82, assuming that the number one slide is to be previewed before projection in the manner described in connection with FIGURES 1A through 1D. If some intermediate portion of the tray is to be located for first cycling an intermediately numbered slide, the half-cycle knob 231 is actuated to activate the half-cycle stop, and the cycling switch 242 is depressed to bring the mechanism into the condition wherein the retaining finger release lever 201 is in its inactive position as shown in FIGURE 5. The tray can then be properly positioned, the half-cycle stop inactivated and cycling of the mechanism effected at will by operation of the cycling switch 242.

In each full cycle of operation, the sequence of slide handling occurs automatically to attain the results described in connection with FIGURES 1E through 1H.

If at anytime it is desired to find a particular slide for projection, this can be rapidly accomplished by moving the master switch 238 to disconnect the projection lamp 40 while maintaining the circuit through the preview lamp 45 and the motor 129 and holding the cycling switch 242 closed while the slides are successively previewed while the machine continues in uninterrupted cycling either forwardly or in reverse until the desired slide is found whereupon by proper manipulation of the cycling and reverse switches and the master switch projection of such slide can be effected when it is in proper projecting position in the combination septum lock and projection aperture member 187.

By virtue of the simple gravity feed arrangement, slide handling mechanism is maintained at a minimum and elevation and lowering of the slides is accomplished by the simple lifter arm 177 and tip 180.

For retaining the slide tray against unintentional upward displacement from the track 37, retractable holddown flanges or similar elements are provided along the sides of the track to overlie the respective laterally projecting rails 60 and 65 of the tray. Such a retractable holddown flange lever 248 is mounted adjacent to indexing gear 82 (FIGURE 2). Another such holddown member 249 is mounted along the opposite side of the track 37.

It will be understood that modifications and variations may be effected without departing from the scope of the novel concepts of the present invention.

We claim as our invention:

1. A slide projector including, means for receiving slides to be projected, means for projecting slides onto a screen, means for previewing the slides, and means within the projector for controlling transport of the slides from said receiving means to said previewing means and to said projection means.

2. A slide projector including, a housing, means for receiving slides to be projected, means for projecting slides onto a screen, means for previewing the slides, and mechanical means normally within said housing operating cyclically to control transport of slides from said receiving means to said previewing means and then to said projecting means.

3. A slide projector including, a housing, means for receiving slides to be projected, means for projecting slides onto a screen, means for previewing the slides, and means normally within said housing to control movement of a slide from said receiving means to said previewing means and subsequently to said projection means.

4. A projector including, means for supporting a supply of slides to be projected, means adjacent to said supporting means adapted to hold slides to be projected and including projection optics, means spaced from said receiving means for previewing slides and including illumination means and previewing optics, and a carrier movable between said supporting means and said previewing means for transporting slides to the previewing means before the slides are received by the holding means for projection.

5. A projector including, means for supporting a supply of slides to be projected, means adjacent to said supporting means adapted to receive slides to be projected and including projection optics, means spaced from said receiving means for previewing slides and including illumination means and previewing optics, a carrier movable between said supporting means and said previewing means for transporting slides to the previewing means before the slides are received by the receiving means for projection, and means for transferring a previewed slide from said carrier to said receiving means.

6. A slide projector comprising, a housing carrying projection means and slide previewing means, means for manually receiving slides to be previewed, means for supporting a slide tray adjacent to said projection means, and means normally within said housing for transferring said slides directly from the previewing means to a slide tray on the supporting means.

7. In apparatus for previewing and projecting slides, means for supporting a slide tray having a series of slides loaded therein, means for removing each slide successively from the tray including a previewing support, previewing means including relatively low previewing illumination, means for moving said previewing support into registration with said previewing means, means for shifting the previewed slide into a projection optical path and including means for returning said slide into the tray after projection.

8. In apparatus for previewing and projecting slides, means for supporting a slide tray having a series of slides loaded therein, means for removing each slide successively from the tray including a previewing support, previewing means including relatively low previewing illumination, means for moving said previewing support into registration with said previewing means, means for returning the previewed slide into the tray including means to move this slide into a projection optical path and the succeeding slide into the previewing support, means for returning both of said slides to the tray and thereafter moving the second previewed slide into the projection optical path.

9. A projector comprising, a housing, a projection station, a previewing station, means for supporting a supply of slides, and a carrier normally within the housing for receiving slides from the supporting means and transporting them to the previewing station, said carrier then being operative to return the slides to the supporting means.

10. A projector comprising, a housing, a projection station, a previewing station, means for supporting a supply of slides, a carrier normally within said housing for receiving slides from the supporting means and transporting them to the previewing station, said carrier then being operative to return the slides to the supporting means, and means cooperative with the carrier and the supporting means for effecting transfer of slides between the supporting means and carrier.

11. A slide projector comprising, means for supporting a slide tray carrying a plurality of slides to be projected, means for projecting the slides onto a screen, means for previewing the slides, and means operative to deliver one slide from a tray on said supporting means to said projecting means and the succeeding slide from the tray to the previewing means so that the succeeding slide can be previewed while the first slide is being projected.

12. A slide projector including, means for supporting a slide tray at an elevated position, means below and in alignment with the tray supporting means to receive slides from the supporting means for projection, means laterally disposed relative to said projection means for previewing slides, and means operative between said projection means and said previewing means to transport slides between the projection means and the previewing means.

13. A slide projector including, means for supporting a slide tray at an elevated position, means below and in alignment with the tray supporting means to receive slides from the supporting means for projection, means laterally disposed relative to said projection means for previewing slides, means operative between said projection means and said previewing means to transport slides between the projection means and the previewing means, and a lifter operative between the supporting means and said projecting means for gravitationally delivering slides from the supporting means to said projecting means and said transporting means and returning slides therefrom to said supporting means.

14. A slide projector including, means for supporting a slide tray at an elevated position, means below and in alignment with the tray supporting means to receive slides from the supporting means for projection, means laterally disposed relative to said projection means for previewing slides, means operative between said projection means and said previewing means to transport slides between the projection means and the previewing means, a lifter operative between the supporting means and said projecting means for gravitationally delivering slides from the supporting means to said projecting means and said transporting means and returning slides therefrom to said supporting means, and means for indexing a tray on said supporting means coordinated in operation with said lifting means.

15. A slide projector including: a projection structure, a previewing structure spaced from the projection structure, means for supporting a supply of slides to be previewed and projected, means for transporting slides between the supporting means and the previewing structure, means for transporting slides between the supporting structure and the projection structure and the transporting means, and means cyclically coordinating operation of both of said transporting means.

16. A slide projector including: a projection structure, a previewing structure spaced from the projection structure, means for supporting a supply of slides to be previewed and projected, means for transporting slides between the supporting means and the previewing structure, means for transporting slides between the supporting structure and the projection structure and the transporting means, a shutter operatively movable to open and close a projection path defined by the projection structure, and means for cyclically coordinating operation of said shutter and both of said transporting means.

17. A slide projector including: a projection structure, a previewing structure spaced from the projection structure, means for supporting a supply of slides to be previewed and projected, means for transporting slides between the supporting means and the previewing structure, means for transporting slides between the supporting structure and the projection structure and the transporting means, a shutter operatively movable to open and close a projection path defined by the projection structure, means for indexing the slides, and means for coordinating in cyclical sequence operations of both of said transporting means and said shutter and said indexing means.

18. A slide projector including: a projection structure, a previewing structure spaced from the projection structure, means for supporting a supply of slides to be previewed and projected, means for transporting slides between the supporting means and the previewing structure, means for transporting slides between the supporting structure and the projection structure and the transporting means, a shutter operatively movable to open and close a projection path defined by the projection structure, means for indexing the slides, and drive means including a master coordinating cam disk and transmission structure coordinating cyclical operation of said shutter and said indexing means and both of said transporting means.

19. A slide projector as defined in claim 18, wherein a manually operable member is related to the shutter for actuating the shutter independently of said drive and coordinating means.

20. A slide projector including a housing, projection means, previewing means, means for supplying slides to be projected to the projection means, a carrier normally within said housing to control transport of slides from the supplying means to the previewing means, and ejection means associated with the previewing means for ejecting slides from the carrier.

21. A slide projector including means defining an overhead slide tray track, means for indexing a tray along said track, means below said track providing a projection system, means laterally from said projection system providing a previewing system, a horizontal drive shaft extending adjacent to both of said systems and having means coupling it in driving relation with said indexing means, a carrier mounted slidably along said shaft, means operative to move the carrier from a position aligned with said previewing system to a position under the track for receiving slides therein for previewing, means for transporting slides between said track and said projection system and said carrier, and means for driving said shaft and said carrier and said transporting means in cyclical coordinated relation.

22. A slide projector including, a housing, slide supplying means, slide projecting means, slide previewing means, means normally within said housing operative for transporting slides between said projecting means and said previewing means, and manually operable means for removing slides from and inserting slides in said transporting means while it is operatively related to the previewing means.

References Cited

UNITED STATES PATENTS

| | | | |
|---|---|---|---|
| 2,746,345 | 5/1956 | Graves | 88—26 |
| 2,969,711 | 1/1961 | Robinson et al. | 88—28 |
| 3,002,426 | 10/1961 | McCabe | 88—26 |
| 3,079,840 | 3/1963 | McMaster et al. | 88—28 |
| 3,143,037 | 8/1964 | Jungjohann | 88—26 |
| 3,173,331 | 3/1965 | Danner | 88—28 |

JOHN M. HORAN, *Primary Examiner.*

NORTON ANSHER, *Examiner.*

H. H. FLANDERS, *Assistant Examiner.*